United States Patent Office 3,794,564
Patented Feb. 26, 1974

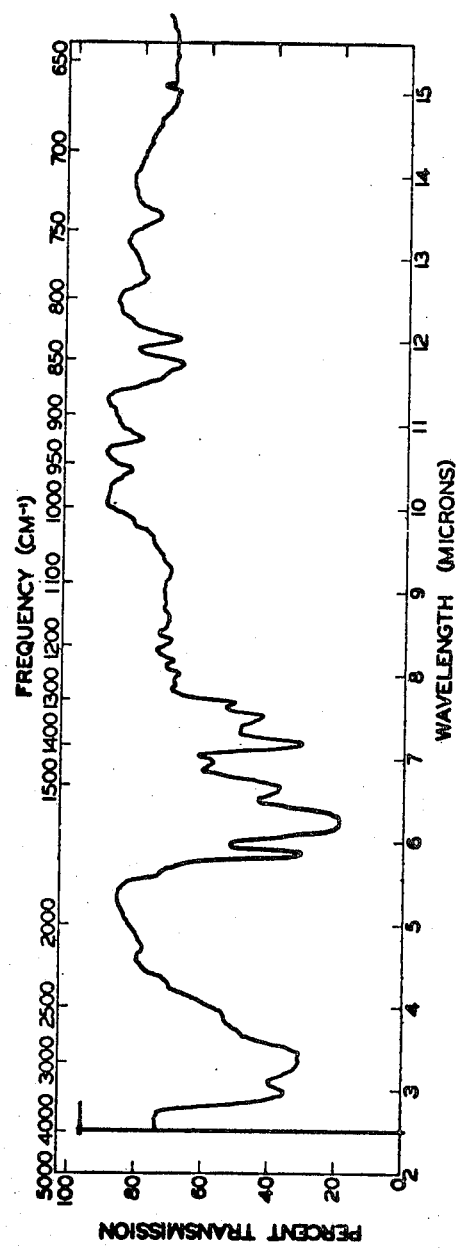

3,794,564
PROCESS FOR THE PRODUCTION OF ANTICAPSIN
David H. Lively, Ramesh M. Shah, and John G. Whitney, Indianapolis, Ind., assignors to Eli Lilly and Company, Indianapolis, Ind.
Continuation-in-part of abandoned application Ser. No. 782,980, Dec. 11, 1968. This application Dec. 29, 1969, Ser. No. 888,878
Int. Cl. C12d 9/00
U.S. Cl. 195—80 R    3 Claims

ABSTRACT OF THE DISCLOSURE

Anticapsin is an antibiotic having antibacterial and anticapsular activity, which inhibits the synthesis of hyaluronic acid, and which is useful as a potentiating agent for certain antibiotics. Anticapsin is produced by the fermentation of *Streptomyces griseoplanus*.

CROSS-REFERENCE TO RELATED APPLICATION

This application is a continuation-in-part of U.S. Ser. No. 782,980, filed Dec. 11, 1968 and now abandoned.

SUMMARY OF THE INVENTION

Various microorganisms, particularly Streptococcus type A organisms, form protective hyaluronic acid capsules which render them fairly resistant to attack by natural body defenses, phage, and possibly, various known antibiotics. Anticapsin prevents such capsule formation, thereby rendering the organism more susceptible to attack by phage. Anticapsin is also thought to render such organisms more susceptible to attack by natural body defenses. When anticapsin is administered to animals in combination with antibiotics active against Streptococcus type A organisms, $ED_{50}$ levels of such antibiotics are significantly lowered. Therefore, anticapsin is considered to enhance the activity of a number of known antibiotics.

Anticapsin, also denominated by the arbitrary name A19427, is an amphoteric molecule produced by culturing under controlled conditions a hitherto undescribed strain of *Streptomyces griseoplanus* NRRL 3507. The compound has the following structure:

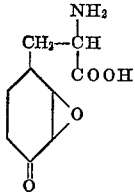

The novel compound is a white, crystalline solid, decomposing at 240–250° C.; soluble in water and dimethylformamide; slightly soluble in methanol and ethanol; and insoluble in acetone, benzene, chloroform, anhydrous ether, ethyl acetate, hexane, and the like.

Anticapsin is relatively stable in solution over a pH range of 5.0 to 7.9. Loss of activity has been observed in solutions having a pH below 3.0 or above 8.0.

Electrometric titration of crystalline anticapsin in a 66 percent dimethylformamide-water solution revealed the presence of two titratable groups: $pK'a_1=4.0$; $pK'a_2=9.8$. Electrometric titration of crystalline anticapsin in water produced a downward shift of the acidic group to $pK'a_1$ of less than 4.0, and a downward shift of the basic group to $pK'a_2=9.25$.

Anticapsin has a molecular weight of 199.

An average of several elemental analyses of crystalline anticapsin dried in vacuo at about 40° C. over phosphorous pentoxide gave the following values for $C_9H_{13}O_4N$:

| Element: | Theory | Found |
|---|---|---|
| Carbon | 54.26 | 53.91 |
| Hydrogen | 6.58 | 6.71 |
| Nitrogen | 7.03 | 6.91 |
| Oxygen | 32.13 | 32.01 |

While it has been established that carbon, hydrogen, oxygen, and nitrogen are the only elements present in the anticapsin molecule, the empirical composition has not yet been established with certainty. However, the above data indicates an approximate empirical formula of $C_{8-9}H_{11-13}O_4N$ or multiples thereof.

The infrared absorption curve of the crystalline compound, when pressed into a potassium bromide pellet, is shown in the accompanying drawing. The distinguishable bands in the infrared spectrum over the range of 2.0 to 15.0 microns are as follows 2.97; 3.35; 3.44; 3.90; 4.70; 5.60; 5.85; 6.25; 6.65; 6.95; 7.18; 7.50; 7.66; 7.88; 8.00; 8.16; 8.40; 8.65; 10.46; 10.82; 11.70; 12.01; 12.75; and 13.50 microns.

Anticapsin exhibits a maximum of $\epsilon=32.4$ at 310 m$\mu$ in the ultraviolet spectrum.

The specific optical rotation of crystalline anticapsin dried in vacuo at room temperature for about 15 hours is as follows: $[\alpha]_D^{25°}=+87°$ (C.=2 percent, w./v. in water).

A powder X-ray diffraction pattern of anticapsin using unfiltered chromium radiation and a wave length value of 2.2896 A. in calculating the interplanar spacings gives the following values.

| d: | $I/I_2$ |
|---|---|
| 18.54 | 0.10 |
| 13.89 | 0.50 |
| 10.48 | 0.30 |
| 5.30 | 1.00 |
| 5.06 | 0.80 |
| 4.34 | 0.70 |

Chemical tests made on crystalline anticapsin show the presence of —$NH_2$ and —COOH groups. When unhydrolyzed anticapsin was analyzed on an automatic amino acid analyzer (accelerated method), two peaks were observed in the neutral amino acid region of the chromatogram, one minor peak, A, and one major peak, B. The minor peak, A, appeared in 65 minutes and the major peak, B, appeared in 75 minutes. When acid hydrolyzed anticapsin was analyzed, the minor peak appeared in 94 minutes and the major peak appeared in 104 minutes. In both instances, there were 10-minute lags between peaks A and B. The smaller peak is thought to indicate the presence of a minor, closely related factor of anticapsin.

Anticapsin reacts with Ninhydrin, potassium permaganate, and iodine, but does not react with the Benedict, Biuret, Fehling, Molish, ferric chloride, and Sakaguchi reagents.

Anticapsin can be identified by paper chromatography on Whatman No. 1 paper, utilizing various solvent systems. The chromatograms were developed by bioautography on agar plates seeded with *Salmonella gallinarium*. The $R_f$ values obtained are shown in Table I.

TABLE I

| Solvent system: | $R_f$ |
|---|---|
| n-Butanol saturated with water | 0.12 |
| N-butanol saturated with water and 2 percent p-toluenesulfonic acid | 0.58 |
| Methanol:0.1 N hydrochloric acid (3:1 by volume) | 0.65 |
| Propanol:pyridine:acetic acid:water (15:13:3:12 by volume) | 0.60 |
| Methanol:.05 M sodium citrate—pH 5.7 (70:30 by volume) | 0.66 |

Anticapsin, when combined with a number of known antibiotics, greatly enhances both the in vivo and in vitro activity of the antibiotics, and thus is useful as a potentiating agent when administered substantially simultaneously with such antibiotics. By virtue of the potentiating effect of anticapsin, antibiotics such as the cephalosporins and nebramycin can be used in smaller dosages than is normally required to obtain a therapeutic effect.

The in vitro activity of anticapsin as a potentiating agent was determined in the standard tube dilution test using trypticase soy broth plus 5 percent rabbit broth as the medium. All tubes were inoculated with $10^5$ cells of either *Streptococcus pyogenes* C203 or *Diplococcus pneumonia* Park I. Anticapsin, sodium cephalothin, cephaloridine, cephalexin, cephaloglycin, and nebramycin were evaluated separately, and then sodium cephalothin, cephaloridine, cephalexin, cephaloglycin, and nebramycin were each evaluated jointly with 125 μg./ml. of anticapsin. The values, expressed as minimum inhibitory concentrations (μg./ml.) were obtained following 24 hours incubation at 37° C., and are tabulated in Tables II and III.

TABLE II

| Compounds: | Minimum inhibitory concentrations (μg./ml.) (*Diplococcus pneumonia*) |
|---|---|
| Anticapsin | 250.000 |
| Sodium cephalothin | 0.125 |
| Sodium cephalothin+125 μg./ml. of anticapsin | 0.031 |
| Nebramycin (factor 6) | 100.000 |
| Nebramycin (factor 6), 125 μg./ml. of anticapsin | 6.250 |

TABLE III

| Compounds: | Minimum inhibitory concentrations (μg./ml.) (*Diplococcus pneumonia*) |
|---|---|
| Anticapsin | 250.000 |
| Sodium cephalothin | 0.125 |
| Sodium cephalothin+125 μg./ml. of anticapsin | 0.031 |
| Cephaloridine | 0.062 |
| Cephalodidine+125 μg./ml. of anticapsin | 0.015 |

The in vivo antibacterial activity of anticapsin, alone and in combination with sodium cephalothin, was determined in mice infected with *S. pyogenes* (800 LD$_{50}$ challenge). Sodium cephalothin was administered orally at one and five hours post-infection, while anticapsin (2 mg./dose) was given subcutaneously at 30 minutes prior to infection and one hour post-infection. Mice were observed for seven days, noting day of death and number of survivors.

In repeated tests, it was observed that anticapsin alone did not inhibit infection. However, when administered in combination with sodium cephalothin, the ED$_{50}$ of sodium cephalothin was lowered from approximately 25.6 mg./kg. to approximately 8.6 mg./kg.

Various microorganisms produce a hyaluronate capsule, which, when present, offers considerable protection against phagocytosis (Wiley, G. G., and A. T. Wilson, "The Ability of Group A Streptococci Killed by Heat, or Mercury Arc Irradiation to Resist Ingestion by Phagocytes," J. Exp. Med. 103:15–35 (1956)), and infection by bacteriophage (Maxted, W. R., "The Influence of Bacteriophage on *Streptococcus pyogenes*," J. Gen. Microbiol., 12:484–495 (1955)). It has been found that anticapsin inhibits the production of hyaluronic acid and the formation of hyaluronate capsules. We have thus designated such activity as "anticapsular" activity.

To illustrate the anticapsular activity of anticapsin, the test organism *Streptococcus pyogenes* C203 was utilized. When cultured in brain heart infusion broth plus 5 percent horse serum, *Streptococcus pyogenes* C203 produces a large hyaluronate capsule which can be measured both qualitatively (capsule stain and phage resistance) and quantitatively, by isolaiton and chemical analysis. When anticapsin is added to a culture of *Streptococcus pyogenes*, at levels which do not inhibit growth of the organism, capsule synthesis is reduced. Such reduction was measured using the turbidometric assay method for acid mucopolysaccharides as described by Di Ferrante (Di Ferrante, N., "Turbidimetric Measurement of Acid Mucopolysaccharides and Hyaluranidlase Activity," J. Biol. Chem., 220: 303–306 (1956)). The results are shown in Table IV.

TABLE IV

| | G. hyaluronic acid/ cells (dry weight) | Percent inhibition |
|---|---|---|
| Untreated culture (control) | 0.043 | |
| Culture plus 15 μg./ml. anticapsin | 0.012 | 72 |

Cells which have been treated with anticapsin as outlined above are rendered more susceptible to in vitro and in vivo phagocytosis by human neutrophiles. The in vitro results in Table V were obtained using the technique of Wiley and Wilson (J. Exp. Med. 103:15–35 (1956)). The in vivo results shown in Table VI were obtained as follows.

A sterile peritonitis was induced in male rats weighing 140–160 grams by injecting 10 ml. of 1 percent glycogen in isotonic saline into each rat one hour prior to challenge with *Streptococcus pyogenes*. Two ml. of a cell suspension containing $2.2 \times 10^{-8}$ cells per ml. were injected intraperitoneally. The animals were sacrificed one hour after challenge, and leukocytes were harvested after the injection of 10 ml. of 0.145 M NaCl with 0.02 M sodium citrate into the peritoneum. Slide smears of each leukocyte population were prepared and stained with Wright's stain. The percentage of each cell type phagocytizing Streptococci was determined. The populations and percent of phagocytizing cells are listed in Table VI. Percents are listed in parentheses.

TABLE V

| Culture treatment: | Percent of neutrophiles ingesting Streptococci |
|---|---|
| Control (encapsulated) | 11 |
| Anticapsin, 5 μg./ml. | 13 |

TABLE VI

| Culture | Monocytes | Polymorphonuclear leucocytes | Percent of all cells phagocytized |
|---|---|---|---|
| Saline control | (38) | (24) | 22 |
| Anticapsin, 15 mcg./ml | (77) | (40) | 37 |

Anticapsin is also useful as an antibacterial agent in scrub solutions, solutions for sterilizing hospital instruments, and the like, against susceptible organisms, since it possesses in vitro antibacterial activity against a variety of standard laboratory microorganisms used in the screen for activity against pathogens. The antibacterial spectrum of anticapsin, representing the concentration required to inhibit the growth of various typical bacteria, was determined in a standard manner by either the agar-dilution streak plate technique (a.d.), in the presence or absence of horse serum, or the broth dilution technique (b.d.) which are commonly used in the art. The minimum inhibitory concentrations expressed in micrograms per disc (a.d.) or micrograms per milliliter (b.d.) of anticapsin against various test organisms are set forth in Table VII, with TSA standing for trypticase soy agar, and TSB standing for trypticase soy broth.

TABLE VII

| Organism: | Minimum inhibitory concentration |
|---|---|
| *Diplococcus pneumonia*— | |
| A.d. (TSA+blood) | |
| 5 percent μg./disc | 6.25 |
| B.d. (TSB+blood) | |
| 5 percent μg./ml | 250.00 |
| *Streptococcus pyogenes*— | |
| A.d. (TSA+blood) | |
| 5 percent μg./disc | 0.40 |
| B.d. (TSB+blood) | |
| 5 percent μg./ml | 250.00 |
| *Salmonella gallinarium*, | |
| a.d. (TSA) μg./ml | 6.25 |
| *Bacillus subtilis*, a.d. (TSA) μg./disc | 25.00 |
| *Sarcina lutea*, a.d. (TSA) μg./disc | 25.00 |

It was also found that anticapsin exhibits in vitro activity against at least 19 strains of *Staphylococcus aureus*, both in the presence and absence of horse serum, over a pH range of from 6.7 to 8.4 at levels of from about 125 to about 500 μg./ml., using the agar dilution technique with Biochem No. 2 agar.

Anticapsin can be produced by culturing a newly found and hitherto undescribed organism strain isolated from soil samples obtained from Surinam, Venezuela.

The organism was isolated from the above soil samples by suspending portions of the soil samples in sterile distilled water, and by streaking the suspensions on nutrient agar. The seeded nutrient agar plates were incubated at about 25–35° C. for several days. Following the incubation time, colonies of the anticapsin-producing organisms were transferred with a sterile platinum loop to agar slants. The agar slants were then incubated to provide suitable amounts of inoculum for the production of anticapsin.

The actinomycete used according to this invention for the production of anticapsin has been designed as a strain of *Streptomyces griseoplanus*, Backus et al. One of its strain characteristics is the production of anticapsin. A subculture of the organism can be obtained, without restriction, from the permanent collection of the Northern Utilization and Research Division, Agricultural Research Service, U.S. Department of Agriculture, Peoria, Ill. Its accession number in this repository is NRRL 3507.

The characteristics of *Streptomyces griseoplanus* NRRL 3507 are given in the following tables. The methods recommended from the International Streptomyces Project for the characterization of Streptomyces species have been used along with certain supplementary tests (Shirling, E. B. and D. Gottlieb, 1966, "Methods for Characterization of Streptomyces Species," Intern. Bull. Systematic Basteriol. 16:313–340). Color names were assigned according to the ISCC–NBS method prescribed by Kelly, K. L. and D. B. Judd, 1955 (The ISCC Method of Designating Colors and a Dictionary of Color Names, U.S. Department of Commerce Circ. 553, Washington, D.C.). Figures in parentheses refer to the Tresner and Backus color species (Tresner, H. D. and S. J. Backus, 1963, "System of Color Wheels for Streptomycete Taxonomy," Appln. Microbiol., 11:335–338), and color tab designations are underlined. The Maerz and Paul color blocks are enclosed in brackets (Maerz, A. and M. R. Paul, 1950, Dictionary of Color, McGraw-Hill Book Co., Inc., New York). Cultures were grown at 30° C. for 14 days unless noted otherwise.

TABLE VIII

| Property observed | Characteristic of NRRL 3507 |
|---|---|
| Morphology | Loose to open spirals principally produced with some flexuous sporophores; spores usually in chains of from 10 to 50, spores oval to elliptical, 0.67–1.0μ × 1.34–2.0μ, with warty spore surfaces as observed in electron micrographs. |
| Cultural characteristics on: | |
| ICP No. 2 (Yeast extract-Maltex agar). | Growth abundant, reverse medium yellow brown [1417]; aerial mycelium and sporulation abundant, light grayish reddish brown (GY) 5fe [5C7] and yellowish gray 2de [12A3]; brown soluble pigment. |
| ICP No. 3 (oatmeal agar). | Growth fair, reverse light grayish yellowish brown [13D2]; aerial mycelium and sporulation fair, light gray (GY) d [43Ai]; brown soluble pigment. |
| ICP No. 4 (Inorganic salts-soluble starch). | Growth abundant, reverse yellowish gray [44A1]; sporulation abundant, medium gray (GY) e [45A1]; greenish brown soluble pigment. |
| ICP No. 5 (glycerol-asparagine). | Growth moderate, reverse pale yellow [11C2]; sporulation moderate, yellowish gray (GY) 2dc [12A3]; no soluble pigment. |
| Tomato paste-oatmeal. | Growth abundant, reverse yellow beige [13H7]; sporulation abundant, light brownish gray (GY) 3fe [14A3]; brown soluble pigment. |
| Emerson's agar | Growth abundant, reverse medium yellow brown [1418]; sporulation sparse, no color assignment; brown soluble pigment. |
| Bennett's agar | Growth abundant, reverse light yellowish brown [13J7]; sporulation abundant, light grayish reddish brown (GY) 5fe [5C7]; brown soluble pigment. |
| Czapek's agar | Growth moderate, reverse pale yellow [11C2]; aerial mycelium moderate, white (W) a; no soluble pigment. |
| Glucose-asparagine | Growth moderate, reverse grayish yellow [12B2]; sporulation moderate, dark gray, (GY) 3ih [16A2]; no aerial mycelium; no pigment. |
| Tyrosine agar | Growth moderate, reverse olive gray [47A1]; no aerial mycelium; no pigment. |
| Nutrient agar | Growth fair, reverse light grayish yellowish brown [13D2]; sporulation fair (GY) 2dc [12A3]; no soluble pigment. |
| Calcium malate | Growth moderate, reverse pale yellow [11C2]; sporulation moderate (GY) d [43A1] yellowish gray 2dc [12A3]; light brown soluble pigment. |

TABLE IX.—PHYSIOLOGY

| | |
|---|---|
| Action on milk | No change at 14 days; heavy growth. |
| Nitrate reduction | Positive. |
| Melanin production peptone-iron agar. | Do. |
| Tryptone-yeast extract broth | Do. |
| Gelatin liquefaction | None at 14 days. |
| Temperature requirements | Good growth and sporulation from 26° to 37°, no growth at 43°. |
| Response of substrate color to pH change. | Unaffected. |

In Table X are set forth the results of carbon utilization tests carried out on organism NRRL 3507. In the table, the following symbols are employed:

+ =growth utilization
(+)=probable growth and utilization
(−)=poor growth and probably poor utilization
−=no growth, no utilization.

TABLE X

Carbon utilization pattern for NRRL 3507

| Compound: | Growth response |
|---|---|
| Glucose | + |
| L-arabinose | + |
| Sucrose | (+) to + |
| D-xylose | + |
| D-fructose | + |
| Rhamnose | + |
| Raffinose | (+) to + |
| L-inositol | + |
| D-mannitol | + |
| Dextrose | + |
| Cellobiose | + |
| Control (no carbon) | − |

As noted above, anticapsin can be produced by the cultivation of NRRL 3507. The culture medium employed can be any one of a number of media since, as is apparent from the above-described utilization tests, the organism is capable of utilizing many energy sources. However, for economy of production, maximum yield of the antibiotic, and ease of isolation of the antibiotic, certain culture media are preferable. The media which are useful in the production of anticapsin include an assimilable source of carbon such as dextrin, glucose, sucrose, fructose, starch, molasses, dextrose, corn steep solids, and the like. The preferred sources of carbon are sucrose, dextrin, and dextrose. Additionally, employable media include a source of assimilable nitrogen such as nutrisoy flour and grits, linseed meal, tankage, fish meal, cotton seed meal, oatmeal, ground wheat, soybean meal, beef extract, peptones (meat or soy), casein, amino acid mixtures, and the like. Preferred sources of nitrogen are nutrisoy grits, soybean meal, casein, and corn steep solids.

Mineral salts, for example, those providing sodium, potassium, ammonium, calcium, magnesium, cobalt, sulfate, chloride, phosphate, carbonate, acetate, and nitrate ions, and a source of growth factors such as distillers' solubles and yeast extract, can be incorporated into the media with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied widely; however, it has been found that the initial pH of the medium desirably is between about pH 6.0 and about pH 7.0 and preferably is between pH 6.9 and about pH 7.0. As has been observed with other actinomycetes, the pH of the medium gradually increases throughout the growth period of the organism during which time anticapsin is produced, and may obtain a pH from about pH 7.0 to about pH 7.6 or above, the final pH being dependent at least in part on the initial pH of the medium, the buffers present in the medium, and the period of time the organism is permitted to grow.

Submerged, aerobic cultural conditions are the conditions of choice for the production of large amounts of anticapsin. For preparation of relatively small amounts, shake flasks and surface culture in bottles can be employed. For the preparation of large amounts, submerged aerobic cultures in sterile tanks is preferred. The medium in the sterile tank can be inoculated with a sporulated suspension. However, because of the growth lag experienced when a sporulated suspension is used as the inoculum, the vegetative form of the culture is preferred to avoid the pronounced growth lag, thereby permitting a more efficient use of fermentation equipment. Accordingly, it is desirable first to produce a vegetative inoculum of the organisms by inoculating a relatively small quantity of culture medium with the spore form of the organism, and when a young, active, vegetative inoculum has been obtained, to transfer the vegetative inoculum aseptically to the large tank. The medium in which the vegetative inoculum is produced can be the same or a different medium than that utilized for the large-scale production of anticapsin.

The organism grows best at temperatures in a range of about 25° C. to about 32° C. Optimal anticapsin production appears to occur at a temperature of about 30° C.

As is customary in submerged culture processes, sterile air is forced through the culture medium. For efficient growth of the organism and anticapsin production, the volume of air employed in the tank production of anticapsin preferably is upwards of 0.1 volume of air per minute per volume of culture medium. Efficient growth and optimal yields of anticapsin are obtained when the volume of air used is at least 0.5 volume of air per minute per volume of culture medium.

In general, after inoculation maximum production of anticapsin occurs within about 3 to 7 days when submerged, aerobic culture in shake flasks culture is employed.

The mycelium and undissolved solids are removed from the fermentation broth by conventional means such as filtration or centrifugation. Anticapsin is removed from the filtered or centrifuged broth by employing adsorption techniques as described hereinafter.

For the recovery of anticapsin by adsorption techniques, various adsorbants and ion exchange resins can be used, for example, carbon, silica gel, and ion exchange resins such as carboxymethyl cellulose resins, and "Dowex" 50.

This invention is further illustrated by the following specific examples.

EXAMPLE 1

Shake flask production of anticapsin

A sporulated culture of NRRL 3507 was produced by growing the organism on a nutrient agar slant having the following composition:

|  | G./l. |
|---|---|
| Dextrin (sold by Baker and Adamson) | 10.00 |
| Yeast extract | 1.00 |
| Hydrolyzed casein ("N-Z Amine Type A") (sold by the Sheffield Chemical Co.) | 2.00 |
| Beef extract | 1.00 |
| Cobaltous chloride hexahydrate | 0.01 |
| Meer agar (washed three times) | 20.00 |
| Deionized water. | |

The pH of the medium was adjusted to pH 7.0 by the addition of sodium hydroxide.

The slant was inoculated with spores of NRRL 3507 and was incubated for 7 days at 34° C. The slants were covered with sterile distilled water and gently scraped to remove the spores and provide an aqueous suspension thereof. One milliliter of the resulting spore suspension was used to inoculate each 100 ml. portion of a vegetative medium having the following composition:

|  | G./l. |
|---|---|
| Dextrose | 15.0 |
| Nutrisoy grits | 15.0 |
| Corn steep liquor | 10.0 |
| Sodium chloride | 5.0 |
| Calcium carbonate | 2.0 |
| Tap water. | |

The pH of the vegetative medium was adjusted to pH 6.5 by the addition of sodium hydroxide, prior to sterilization at 120° C. for 30 minutes.

The inoculated vegetative medium was incubated at 30° C. for 48 hours, during which time the incubator was shaken at the rate of 250 revolutions per minute on a rotary shaker having a two-inch diameter arc. The inoculum so prepared was then utilized in the production of anticapsin as follows:

A production medium was prepared having the following composition:

|  | G./l. |
|---|---|
| Dextrose | 15.0 |
| Dextrin 700 | 10.0 |
| Nutrisoy grits | 15.0 |
| Sodium chloride | 5.0 |
| Casein | 1.0 |
| Yeast 2019 | 1.0 |
| Antifoam A (sold by the Dow Corning Co.) | 0.2 |
| Water. | |

Two hundred and twenty milliliter portions of the production medium were placed in one liter Erlenmeyer flasks which was inoculated with a five percent vegetative inoculum. The fermentation was carried out at a temperature of 30° C. for 64 hours, and agitated with a rotary shaker having a two-inch diameter stroke operated at 250 revolutions per minute.

Isolation of anticapsin

Whole broth (25 liters), obtained from the fermentation described above, was filtered using a 2 percent diatomite filter pad. The filtered broth contained 516.6 mcg./ml. of anticapsin. To the stirred filtrate was added 2 percent by weight of finely divided carbon. The mixture was filtered, and the carbon was eluted four times with one-third volumes of 30 percent methanol. The combined washings and effluent were treated with an additional one percent of finely divided carbon, stirred for an hour, and filtered. The carbon was again washed three times with 30 percent methanol and the eluates were concentrated to an aqueous phase and freeze-dried. The dried preparation contained 193.3 mcg. of crude anticapsin.

A 150 x 5 cm. column was packed with 2.5 liters of finely divided silica gel. The dry preparations obtained as described hereinabove were dissolved in water and were chromatographed on this column. The column was eluted with deionized water (ph 5.5) at a rate of 2 ml./min. Active fractions which gave a single Ninhydrin positive spot were pooled and freeze-dried. The dry preparation so obtained was about 80 percent pure. This material was applied to a silica gel column in acetonitrile-water (70:30) and was eluted with the same solvent at a ratio of 2 ml./min. The antibiotic was followed by thin-layer chromatography on silica gel plates developed in the acetonitrile-water system, and sprayed with Ninhydrin and Pan Dutscher reagents. The single spot Ninhydrin positive fractions were combined and freeze-dried. The dry preparation was about 90 percent pure.

Final purification of anticapsin was carried out on a Sephadex G-25 (fine) column. The column was eluted with deionized water (pH 5.7) at a rate of 2 ml./min. The antibiotic fractions were followed by thin-layer chromatography as above. The fractions with single Ninhydrin positive spots were combined and freeze-dried. Crystallization was effected by concentrating under nitrogen a solution of the freeze-dried material in methanol. The final recovery of crystalline anticapsin was 12 percent by weight based upon the filtered broth.

EXAMPLE 2

Pilot plant production of anticapsin A19427

To a 40-liter stainless steel fermenter was added 24 liters of the medium employed in shake flask production of Example 1.

|  | G./l. |
|---|---|
| Dextrose | 15.0 |
| Dextrin 700 | 10.0 |
| Nutrisoy grits | 15.0 |
| Sodium chloride | 5.0 |
| Casein | 1.0 |
| Yeast | 1.0 |
| Antifoam A (sold by the Dow Corning Co.) | 0.2 |
| Water. | |

The medium was adjusted to pH 6.7 with 1 N sodium hydroxide, sterilized for 30 minutes at 120° C., and cooled. The cooled medium was inoculated with 200 ml. (0.8 percent) of the inoculum produced as in Example 1. The fermentation was carried out at 30° C. for 114 hours. The fermentation medium was aerated by the addition of sterile air at the rate of 0.35 v./v./min. and was agitated with an impeller operated at 420 revolutions per minute.

Anticapsin is recovered from the broth following the isolation procedure set forth in Example 1.

We claim:
1. A method for producing the antibiotic compound of the formula

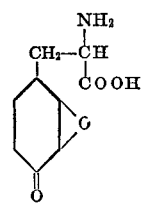

which comprises cultivating *Streptomyces griseoplanus* NRRL 3507 in a culture medium containing assimilable sources of carbon, nitrogen, and inorganic salts under submerged aerobic conditions until a substantial amount of antibiotic is produced by said organism in said culture medium and recovering said antibiotic from said culture medium.

2. A method according to claim 1 wherein said culture medium is maintained at a temperature of about 25-32° C. and the growth of the organism is carried out for a period of about 3-5 days.

3. The method of claim 2 additionally comprising recovering the antibiotic from the culture medium by adsorption of anticapsin on a suitable adsorbing agent and eluting the anticapsin therefrom with a suitable solvent.

References Cited

Miller: "The Pfizer Handbook of Microbial Metabolites," 1961, McGraw-Hill, New York, p. 350.

JOSEPH M. GOLIAN, Primary Examiner

U.S. Cl. X.R.

260—348 C; 424—278